Patented Aug. 21, 1934

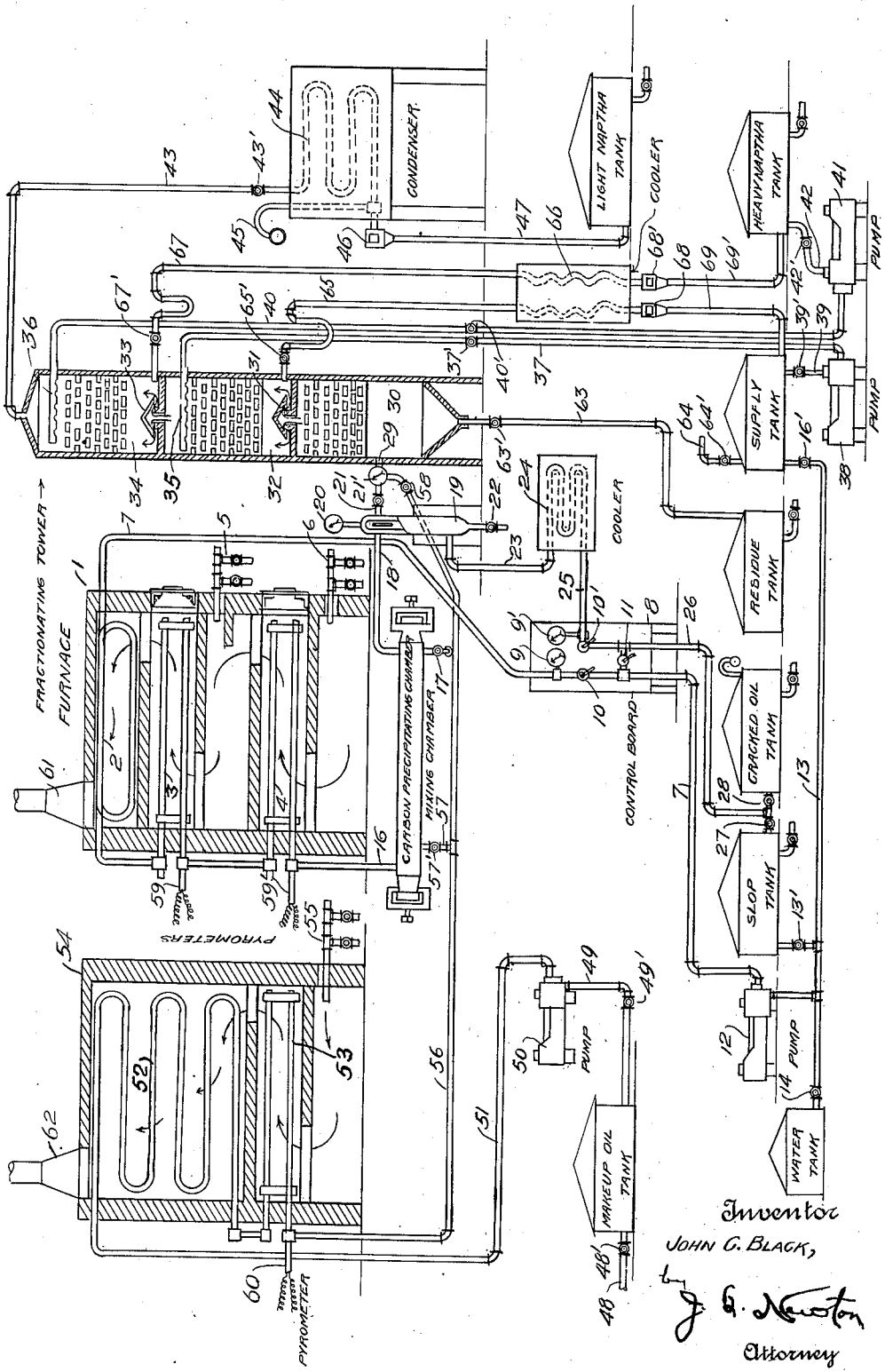

1,971,248

UNITED STATES PATENT OFFICE 1,971,248

PROCESS AND APPARATUS FOR PRODUCING LOW BOILING POINT HYDROCARBONS FROM HIGH BOILING POINT HYDROCARBONS

John C. Black, Destrehan, La., assignor, by mesne assignments, to Gasoline Products Company, Inc., Wilmington, Del., a corporation of Delaware Application November 21, 1922, Serial No. 602,439

32 Claims. (Cl. 196—51)

This invention relates to the production of low boiling point hydrocarbons from those of high boiling point hydrocarbons and to a process and apparatus for accomplishing the conversion in a continuous manner.

In my Patent 1,456,419, which is a continuation in part of my Patents Nos. 1,426,813 and 1,431,772, of which the present application is also a continuation in part, I describe a process and apparatus for the production of low boiling point hydrocarbons from those of high boiling point hydrocarbons.

My present invention is an improvement thereon and I am enabled to increase the yield of low boiling point hydrocarbons and also effect a very great saving in cost and equipment in providing means for producing the hydrocarbons to be cracked from crude petroleum oils, petroleum residues or petroleum distillates, and in a continuous manner.

This result is obtained by my use of the apparatus and the process as described in my Patent 1,456,419 with the addition of certain equipment wherein the crude petroleum, the petroleum residues or the petroleum distillates are prepared for introduction into the apparatus as described in Patent No. 1,456,419.

In my present invention, I employ the same temperatures and pressures as employed in my previous patents above referred to, but instead of continually supplying cracking oil from an outside source to the supply tank, as shown in the drawing accompanying my application, Patent 1,456,419, I employ a supply derived from the fractionating tower shown in the same patent; the fractionating tower in turn deriving its supply of oil (or oil vapor) direct from an oil supply derived in part from the oil run through the cracking coils and in part from a new source of oil or of hydrocarbons, and such a quantity of additional new supply is injected into the fractionating tower that on vaporization and fractionation there will be produced sufficient of that fraction going to the supply tank as to make up for the amount extracted in the light naphtha, the heavy naphtha, and the residue; that is to say the quantity going to the supply tank is the same as that being drawn from the supply tank, the shortage being continually compensated for by the supply derived from the crude petroleum, the petroleum residues, or distillates as described.

To accomplish the above described results, I employ an oil heater, preferably of a tubular type, a form of which I show in the accompanying drawing, for preheating what I call the make-up oil and which may be crude petroleum, or any suitable petroleum residues, or any hydrocarbons that will produce the proper stock to be cracked and which is stored in the supply tank. The make-up oil being properly preheated is then injected into the fractionating tower where it is vaporized and fractionated, any heavy residues being drawn off through the bottom section of the tower, and the vapors ascending through the tower are fractionally condensed in the manner described in my before-mentioned Patent 1,456,419. Together with the vapors from the make-up oil are the vapors from the oil that has passed through the converter or cracking coils— the condensates from the two intermingled vapors will form the various fractions that are the products of the process, such as the light naphtha, the heavy naphtha, and the converter supply stock stored in the supply tank. These various fractions are produced in a continuous manner as long as the make-up oil is continuously supplied.

The make-up oil may be injected into the fractionating tower in several ways:—first, by direct injection into the lower compartment of the tower; second, by injection into a header 21' shown on the drawing to be mixed with the oil discharged through the pressure release and discharge valve 21, the header in turn discharging into the fractionating tower; third, by having the oil under sufficient pressure to be discharged into the carbon precipitating chamber and mixer chamber.

In the accompanying drawing the last two methods of connection are shown and my preferred method of operating is the last above referred to. I choose this method for several reasons: first, I can cool the oil entering the carbon catcher from the cracking coil and at the same time increase the heat of the make-up oil, rendering it easier to vaporize; second, by heating the make-up oil as is possible to a point above its cracking point, there will result an increased yield of low boiling point hydrocarbons obtained from the heavy fractions of the make-up oil which would not have been obtained otherwise; third; the make-up oil, if heated above its cracking temperature, will have its viscosity very materially reduced and the residue drawn from the lower compartment of the fractionating tower will have a lower viscosity than if it had not been heated above its cracking point. The advantage in cracking the make-up oil in the carbon catcher or mixer in place of the make-up oil heater is that there will be no undue fouling of the apparatus brought about by the formation of carbon, as the cracking will take place in a large body or bath of oil and the carbon will be held in suspension in the oil and swept out of the apparatus, whereas if the make-up oil were to be heated in a separate tubular heater, or as above mentioned in the make-up oil heater, to a point above its cracking temperature, there would be deposited a carbon residue that would soon foul the tubes and render the apparatus inoperative. Fourth, by the addition of a cooler hydrocarbon to the cracked hydrocarbons in the mixing chamber, the temperature of the mixture can be made such that the corrosive action of the sulphur or the sulphur compounds found in the oils will be materially reduced or may even be eliminated altogether, whereas if the heat of the cracked hydrocarbons was not reduced there would be a very destructive action by the sulphur or sulphur compounds forming sulphides with the metal parts of the apparatus.

For convenience in describing the process, the apparatus which I prefer to employ is illustrated in the accompanying drawing which is a part sectional part elevational view of the apparatus.

The apparatus as shown in this application is practically that shown in Patent 1,456,419 which provides for two methods of operating—one through the fractionating tower and one through the cooler and to the cracked oil tank. I employ this same method of operating as it makes the plant flexible and easy of control, but as before stated in this application, I have the additional make-up oil heater to properly heat the supplementary supply of hydrocarbons in order to make the process self-contained and a continuous one and to gain the advantages of increased yield of low boiling point hydrocarbons, the minimizing of the sulphur action and the reduction of the viscosity of the residue all as before described.

In the drawing, 1 represents a furnace equipped with cracking coils 2, 3 and 4; heated by oil or gas burners 5 and 6; connected to the coil 2 is a feed pipe 7 connecting with the control board 8 on which are mounted gauges 9 and 9' and valves 10 and 10' and crossover 11; from the control board pipe 7 connects with the discharge of the pump 12 which in turn takes suction through the pipe 13 to the water tank fitted with valve 14, also with the slop tank fitted with valve 13', and also with the supply tank fitted with valve 16'. The outlet of the coil 4 connects through pipe 16 to the carbon catcher and mixing chamber from which leads a blow-off connection and valve 17, and an oil discharge pipe 18 to the bypass trap 19, fitted with a gauge 20, and an upper discharge connection and valve 21, into the header 21' connecting with the fractionating tower, also a bottom blow-off connection and valve 22, and a lower discharge pipe 23 into the cooler 24, fitted with a discharge pipe 25 to the control board. In the pipe 25 is a pressure reducing and discharge valve 10', discharging into pipe 26 which in turn connects with the slop tank through valve 27 and valve 28 into the cracked oil tank. The pipe header 21' connects through pipe 29 into the compartment 30 of the fractionating tower—the upper portion of the compartment 30 is filled with tile. There is an umbrella covered opening 31 leading from the compartment 30 into compartment 32, the upper portion of which is filled with tile. There is an umbrella covered opening 33 from the compartment 32 into the compartment 34, the upper portion of which is filled with tile. Compartment 32 is fitted with a spray pipe 35 and compartment 34 is fitted with a spray pipe 36; spray pipe 35 is connected by pipe 37 and valve 37' to the pump 38 which in turn takes suction through pipe 39 and valve 39' from the supply tank; spray line 36 is connected by line 40 and valve 40' to the pump 41 which in turn takes suction through pipe 42 and valve 42' from the heavy naphtha tank.

From the top of the fractionating tower leads a vapor pipe 43, through valve 43', into the condenser 44, the terminal of which is fitted with a gas vent 45 and observation box 46, connected through pipe 47 to the light naphtha tank.

The supplementary supply of hydrocarbons is stored in the make-up oil tank and is supplied through the pipe 48 and valve 48'; the pump 50 takes suction on the make-up oil tank through pipe 49 and valve 49' and discharges through pipe 51 to the waste heat coil 52 and heating coil 53, both located in the furnace 54; the coils 52 and 53 are heated by means of the burner 55; the outlet of the coil 53 is connected through pipe 56 to the carbon precipitating chamber and mixing chamber through pipe 57 and valve 57', and also to the pipe header 21' through the valve 58.

The heating coils 3 and 4 in furnace 1 are fitted with pyrometers 59 and 59' and the heating coil 53 in furnace 54 is fitted with a pyrometer 60.

The furnaces 1 and 54 are fitted with stacks 61 and 62 respectively.

The fractionating tower is fitted with a conical bottom which forms the bottom of compartment 30 from which leads a pipe 63 and valve 63' to a residue tank.

The pipe 64 and valve 64' is connected to an outside source of supply of cracking oil and is used as an emergency supply.

The operation of the process is as follows:

The pump 12 takes suction through the pipe 13 and valve 16' with valves 14 and 13' closed, thereby giving the pump a supply of oil which is then discharged through the pipe 7 to the control board on which is mounted the valve 10 and which is now open to permit the oil to pass to the heating coils 2, 3 and 4, the cross over valve 11 being closed; from the coil 4 the oil passes through pipe 16 to the carbon precipitating and mixing chamber from whence it flows through pipe 18 to the bypass trap 19 then through the pressure reducing and discharge valve 21 and into the pipe header 21' which in turn discharges into the fractionating tower through connection 29, the blow-off 22 on the bypass trap 19 being closed and valve 10' also being closed. If the oil is not properly cracked or is not sufficiently heated to properly vaporize in the fractionating tower, then valve 21 is closed and valves 10' and 27 opened to permit the oil to flow through the pipe 23 and cooler 24 to the control board, thence through pipe 26 to the slop tank from which it may be rerun.

When the oil is properly cracked and at a vaporizing temperature, it is discharged into the fractionating tower to be vaporized and fractionated. When this step in the process is reached, the pump 50 is started, taking its suction through pipe 49 and valve 49', pumping oil from the make-up oil tank and discharging it through the line 51 into the heating coils 52 and 53 from which it is discharged through the pipe 56, the connection 57 and valve 57' (valve 58 being closed) into the carbon precipitating and mixing chamber where it meets the highly heated cracked hydrocarbons coming from the cracking coils 2, 3 and 4, the temperature of which will be at times as high as 1000° F., but usually from around 650° F. to 900° F. The temperature of the make-up oil coming from the heating coils 52 and 53 is so regulated that substantially no cracking will occur in these coils, but when it is injected into the mixing chamber and is mixed with the highly heated cracked oil coming from the cracking coils 2, 3 and 4 there will result a temperature in the mixture which will be above the incipient cracking point of the make-up oil with the result that cracking will take place in the heavy fractions therein and thereby increase the total yield of the low boiling point hydrocarbons.

From the mixing chamber the mixture of hydrocarbons passes to the fractionating tower which for convenience of construction may be built as depicted in the drawing and consists of three compartments, the lower one acting as a vaporizing compartment and residue collecting chamber, the second compartment as a condensing compartment, the condensing action being brought about by the oil sprayed into the upper portion of the compartment, the spray oil being the same as that which is condensed and is drawn from the supply tank through pump 38. The condensate drawn from the lower portion of the compartment 32 is run to the supply tank through pipe 65 and valve 65', cooler 66, lock box 68 and pipe 69.

The make-up oil is usually crude petroleum or a petroleum residue which will contain the fractions desirable for cracking and when heated in its heater and then its heat increased by its introduction into the mixing chamber and discharged into the fractionating tower, it will more or less vaporize, the heavy tarry residues will precipitate and will be drawn off through pipe 63 and valve 63' into the residue tank, and the vaporized portion will ascend into the upper compartments; the heavier fractions will be condensed in the second compartment, lighter fractions in the third compartment, and the lightest fractions will pass out of the tower through pipe 43 and be condensed in the condenser 44 and run to the light naphtha tank through pipe 47 and observation box 46. The condensate from the upper compartment is run to the heavy naphtha tank through the pipe 67, valve 67', cooler 66, observation box 68' and pipe 69'; the condensation of the heavy naphtha being brought about by the spray wash injected through the spray pipe 36, the spray wash being the heavy naphtha circulated by the pump 41 which takes suction through the suction pipe 42 and valve 42' connecting with the heavy naphtha tank and discharging through the pipe 40 and valve 40' into the spray pipe 36, in this manner condensing heavy naphtha with a condensing wash of heavy naphtha.

The proportion of make-up oil is so adjusted that its content of cracking distillate when separated in the fractionating tower and run to the supply tank will just compensate for the loss of stock taken from the supply tank and cracked in the coils 2, 3 and 4, and which on being fractionated will not be returned to the supply tank. This loss is represented by the light overhead fraction going to the condenser 44; the heavy naphtha fraction and the residue drawn off through pipe 63; these various fractions being derived from the original oil passing through coils 2, 3 and 4.

For instance, with a topped residuum as the make-up oil, it will require about 40% of residuum to 60% of cracking distillate to balance the operation and make the process a continuous one.

If I do not inject the heated make-up oil into the mixing chamber, I close valve 57' in pipe 57 and open valve 58 connecting with the header 21' from which it discharges into the fractionating tower through pipe 29 to be vaporized and fractionated as before described.

What I claim as new and desire to protect by Letters Patent is:

1. A process for cracking hydrocarbon comprising heating a supply of hydrocarbon to a temperature sufficient to crack them and under a pressure sufficient to prevent substantial vaporization thereof, separately heating a second supply of hydrocarbon, discharging both supplied into a carbon precipitating and mixing chamber, then discharging all of the mixed hydrocarbons from the said mixing chamber through a pressure reducing and discharge valve into a vaporizing and fractionating apparatus wherein the lower boiling point hydrocarbons are vaporized and separated from the higher boiling point hydrocarbons and the vaporized fraction is fractionated to condense and thereby separate higher boiling constituents, separately collecting the fractionated vapors, returning the condensed higher boiling point hydrocarbons to the oil cracking furnace coils of the apparatus to be re-cracked in the cycle of operations, and supplying sufficient new stock to keep constant the supply of hydrocarbons to the mixing chambers.

2. A process of cracking hydrocarbons to produce those of lower boiling point from those of higher boiling point comprising heating them in a coil in a single passage through a furnace, and heating them to a temperature sufficient to crack them and under sufficient pressure to prevent their substantial vaporization, then discharging them into a chamber of larger cross sectional area than the tubes of the coil to thus reduce the velocity of flow of the hydrocarbons, separately heating to a less extent a second supply of hydrocarbons and discharging them into said chamber where they are intimately mixed with the first supply, said second supply of hydrocarbons acting as a cooling medium for the previously cracked hydrocarbons and in turn being heated to a cracking temperature and cracked, thereby increasing the yield of low boiling point hydrocarbons, then discharging the mixture prior to separation of vapors therefrom from the mixing chamber at the resultant temperature of the two hydrocarbons into an evaporator and fractionating apparatus and separating the low boiling point fractions from the higher boiling point fraction and returning the higher boiling point fraction to the oil cracking coils of the apparatus to again undergo the process of cracking.

3. A process of cracking hydrocarbons to produce those of lower boiling point from those of higher boiling point, comprising heating a supply of hydrocarbons to a temperature sufficient to crack them and under sufficient pressure to prevent substantial vaporization thereof, then discharging them into a carbon precipitating and mixing chamber, simultaneously separately heating a second supply of hydrocarbons and discharging them into said chamber at a lower temperature than the first mentioned hydrocarbons to reduce the temperature of the cracked hydrocarbons, the cooling effect being such that the temperature of the mixed hydrocarbons will be reduced below the temperature at which the corrosive action on the metallic parts of the apparatus by sulphur or sulphur compounds present in the hydrocarbons would quickly destroy the apparatus, then discharging substantially all of the hydrocarbons from the mixing chamber prior to separation of vapors therefrom into an enlarged separating zone wherein vapors and liquid residues separate, and fractionating the resulting vapors.

4. A process of cracking hydrocarbons to produce those of lower boiling point from those of higher boiling point comprising heating a supply of hydrocarbons to a temperature sufficient to crack them while maintaining them under a pressure sufficient to prevent substantial vaporization thereof, separately heating a second supply of hydrocarbons to a lower temperature, mixing the supplies of hydrocarbons in a chamber while maintaining them under such pressure and discharging all of the resulting mixture from said chamber prior to separation of vapors therefrom, into a separating zone wherein vapor and liquid residual products separate, withdrawing liquid residue from said separating zone and discharging it from the process without returning any of it to either of said heating steps, fractionating the vaporized hydrocarbons as desired, separating the low boiling point hydrocarbons and returning high boiling point hydrocarbons separated by said fractionation to the cracking zone, and adding to the operation enough hydrocarbons from said second supply to maintain a continuous supply of charging stock for the cracking stage of the process.

5. In an apparatus of the class described, a furnace with heating coils therein, means for supplying hydrocarbons from a source of supply under pressure to the furnace coils, a second furnace with heating coils therein, and means for supplying hydrocarbons from a different source of supply under pressure to the second furnace coils, a mixing chamber, connections from the coils in each furnace to the mixing chamber, a fractionating tower and connections between the same and the mixing chamber, means connected to the tower for separately condensing and storing in one storage tank the high boiling point hydrocarbons and in another storage tank the lower boiling point hydrocarbons, a pump, and connections between the tank containing the high boiling point hydrocarbons and the tower whereby the high boiling point hydrocarbons may be returned to the tower and mixed with the hydrocarbons therein.

6. An apparatus of the class described, comprising a furnace heating coils therein, a mixing chamber, means for passing oil first to the coils under pressure and through the coils, to the mixing chamber, a header with connections to the mixing chamber, means for forcing oil from a different source into the mixing chamber or header or into both simultaneously, as desired.

7. A process of cracking hydrocarbons to produce those of lower boiling point from those of higher boiling point, comprising heating a supply of hydrocarbons in a furnace to a temperature sufficient to crack them and under a pressure sufficient to prevent their substantial vaporization; separately heating a second supply of hydrocarbons, discharging both into a carbon precipitating and mixing chamber, maintaining therein a pressure sufficient to prevent substantial vaporization of the mixed hydrocarbons, then reducing the pressure of the mixed hydrocarbons and discharging them into a vaporizing and fractionating apparatus and separating the fractionated constituents.

8. A process of cracking hydrocarbons to produce those of lower boiling point from those of higher boiling point comprising heating one supply of hydrocarbons in a continuous coil in a single passage through a furnace to a temperature sufficient to crack them and under a pressure sufficient to prevent their substantial vaporization; separately heating a second supply of hydrocarbons in a second furnace discharging both supplies into a carbon precipitating and mixing chamber, maintaining therein a pressure sufficient to prevent substantial vaporization of the mixed hydrocarbons, then reducing the pressure and without further application of heat, fractionating the mixed supplies of hydrocarbons.

9. A process of cracking hydrocarbons to produce those of lower boiling point from those of higher boiling point, comprising heating one supply of hydrocarbons in a continuous coil in a single passage through a furnace to a temperature sufficient to crack them and under a pressure sufficient to prevent their substantial vaporization; separately heating a second supply of hydrocarbons in a second furnace discharging both supplies into a carbon precipitating and mixing chamber, maintaining therein sufficient pressure to prevent substantial vaporization of the mixed hydrocarbons; then reducing the pressure and without further application of heat discharging them into a vaporizing and fractionating apparatus, fractionating therein the mixed supplies of hydrocarbons, then returning the high boiling point hydrocarbon distillates to the first mentioned furnace to be cracked, in a cycle of operations, substantially as described.

10. A process of cracking hydrocarbons to produce those of lower boiling point from those of higher boiling point, comprising heating one supply of hydrocarbons in a continuous coil in a single passage through a furnace to a temperature sufficient to crack them and under a pressure sufficient to prevent their substantial vaporization; separately heating a second supply of hydrocarbons in a second furnace discharging both supplies into a carbon precipitating and mixing chamber, maintaining therein sufficient pressure to prevent substantial vaporization of the mixed hydrocarbons; then reducing the pressure and without further application of heat, vaporizing and fractionating the hydrocarbons, withdrawing all unvaporized residue from the system, returning the high boiling point fraction to the first mentioned furnace to be further cracked, removing the low boiling point fractions and adding enough hydrocarbons to the said second supply of hydrocarbons to compensate for the loss of those removed from the system.

11. A process of cracking hydrocarbons to produce those of lower boiling point from those of higher boiling point, comprising heating a primary supply of hydrocarbons to a temperature sufficient to crack them and under a pressure sufficient to prevent their substantial vaporization; separately heating to a temperature below the cracking temperature a second supply of hydrocarbons; discharging both supplies into a carbon precipitating and mixing chamber, regulating the temperature so that when the cracked hydrocarbons of the primary supply are mixed with the cooler hydrocarbons of the secondary supply, the temperature of the mixture will be above the cracking temperature of the higher boiling hydrocarbons of the secondary supply, and maintaining on the mixture of hydrocarbons in the mixing chamber a pressure sufficient to prevent their substantial vaporization, then reducing the pressure and discharging the mixed hydrocarbons from the mixing chamber and fractionating them, as described.

12. A process of cracking hydrocarbons to produce those of lower boiling point from those of higher boiling point, comprising heating a primary continuous supply of hydrocarbons to a temperature sufficient to crack them, under a pressure sufficient to prevent substantial vaporization thereof, admixing therewith a cooler secondary continuous supply of hydrocarbons, so proportioning the mixture of hydrocarbons that the temperature of the mixture and the time of reaction will be sufficient to crack to a substantial degree the high boiling fractions of the secondary supply of hydrocarbons and maintaining thereon a pressure sufficient to prevent material vaporization of the mixture of hydrocarbons, and continuously discharging both supplies through a pressure reducing and discharge valve into a vaporizing and fractionating apparatus and fractionating and condensing and separating the fractions.

13. The process of cracking hydrocarbons in substantially a liquid phase comprising heating a supply of high boiling point hydrocarbons in a continuous heating element to an active cracking temperature with resultant cracking thereof, then discharging them into a mixing chamber into which is discharged simultaneously a second supply of high boiling point hydrocarbons heated in a continuous heating element to a temperature below that of the first supply, whereby the temperature of the second supply of hydrocarbons is instantaneously increased to an active cracking temperature with resultant cracking thereof and maintaining on the mixture of hydrocarbons sufficient pressure to substantially maintain them in the liquid phase, and discharging the admixed hydrocarbons from the chamber and releasing the pressure thereon.

14. The process of cracking hydrocarbons in substantially a liquid phase comprising heating a supply of high boiling point hydrocarbons in a continuous heating element to an active cracking temperature with resultant cracking thereof, then discharging them into a mixing chamber into which is discharged simultaneously a second supply of high boiling point hydrocarbons heated in a continuous heating element to a temperature below that of the first supply, whereby the temperature of the second supply of hydrocarbons is instantaneously increased to an active cracking temperature with resultant cracking thereof and maintaining on the mixture of hydrocarbons sufficient pressure to substantially maintain them in the liquid phase, and maintaining said pressure to the point of pressure release, and discharging them into a fractionating apparatus, whereby the low boiling point fractions of the evolved vapors are separated from the high boiling point fractions, then returning the latter to be further subjected to cracking in a cycle of operations.

15. The process of cracking hydrocarbons in substantially a liquid phase comprising heating a supply of high boiling point hydrocarbons in a continuous heating element to an active cracking temperature with resultant cracking thereof, then discharging them into a mixing chamber into which is discharged simultaneously a second supply of high boiling point hydrocarbons heated in a continuous heating element to a temperature below that of the first supply, whereby the temperature of the second supply of hydrocarbons is instantaneously increased to an active cracking temperature with resultant cracking thereof, then cooling the admixed hydrocarbons and maintaining on the hydrocarbons throughout the heating mixing and cooling operations a pressure sufficient to prevent material vaporization of the hydrocarbons, and discharging the admixed hydrocarbons and releasing the pressure thereon.

16. The process of cracking hydrocarbons in substantially the liquid phase comprising heating a primary supply of hydrocarbons in a continuous heating element to a temperature sufficient to induce cracking, then discharging them into a reaction chamber for further cracking and introducing therein a secondary supply of hydrocarbons heated to a temperature below that of the first supply but at sufficiently high temperature to prevent the secondary supply of hydrocarbons from acting as a deterrent to the cracking reaction of the primary supply and, by the mixture of hydrocarbons, the secondary supply of less heated hydrocarbons is subjected to an instantaneously increased heating effect with resultant cracking thereof, maintaining on the admixed hydrocarbons a pressure sufficient to prevent material vaporization thereof and withdrawing the mixed hydrocarbons from said chamber and recovering the desired products therefrom.

17. The process of cracking hydrocarbons in substantially the liquid phase comprising heating a primary supply of hydrocarbons in a continuous heating element to a temperature sufficient to induce cracking, then discharging them into a reaction chamber for further cracking and introducing therein a secondary supply of hydrocarbons heated to a temperature below that of the first supply but at a sufficiently high temperature whereby the secondary supply of partially heated hydrocarbons will not act as a deterrent to the cracking reaction of the primary supply and, by the admixture of hydrocarbons, the secondary supply of hydrocarbons is subjected to an instantaneously increased heating effect with resultant cracking thereof, and maintaining on the admixed hydrocarbons a pressure sufficient to prevent material vaporization thereof, and discharging the mixture of heated hydrocarbons into a fractionating apparatus and separating the various fractions and returning the fractions suitable for recracking in a cycle of operations.

18. The process of cracking hydrocarbons in substantially the liquid phase comprising heating a primary supply of cracking stock to a temperature sufficient to induce cracking therein, then admixing with said primary supply while it is at substantially said temperature a secondary supply of less heated hydrocarbons having on normal distillation a viscous residue, whereby the secondary supply of less heated hydrocarbons is supplied with additional heat sufficient to induce cracking thereof, maintaining the hydrocarbons in admixture for a period of time sufficient to effect a substantial degree of cracking of the said secondary supply whereby the normally viscous residues are rendered comparatively non-viscous, maintaining on the primary and secondary supplies and their admixture a pressure sufficient to prevent material vaporization thereof, and withdrawing the mixed hydrocarbons and recovering the desired products therefrom.

19. The process of cracking hydrocarbons in substantially the liquid phase comprising heating a primary supply of cracking stock to a temperature sufficient to induce cracking therein, then admixing with said primary supply while it is at substantially said temperature a secondary supply of less heated hydrocarbons having on normal distillation a viscous residue, whereby the secondary supply of less heated hydrocarbons is supplied with additional heat sufficient to induce cracking thereof, and whereby the normally viscous residues are rendered comparatively non-viscous, then cooling the mixture of hydrocarbons, maintaining on the primary and secondary supplies and their admixture a pressure sufficient to prevent material vaporization thereof and thereafter withdrawing the admixed hydrocarbons and recovering the desired products therefrom.

20. The process of cracking hydrocarbons in substantially the liquid phase comprising heating a primary supply of cracking stock to a temperature sufficient to induce cracking therein, then admixing therewith at substantially said temperature a secondary supply of less heated hydrocarbons having on normal distillation a viscous residue, whereby the secondary supply of less heated hydrocarbons is supplied with additional heat sufficient to induce cracking thereof, maintaining the hydrocarbons in admixture for a period of time sufficient to effect a substantial degree of cracking of the said secondary supply whereby the normally viscous residues are rendered comparatively non-viscous, and maintaining on the primary and secondary supplies and their admixture a pressure sufficient to prevent material vaporization thereof, discharging the admixed heated hydrocarbons into a vaporizing and fractionating zone maintained under reduced pressure, wherein the residues are separated, fractionating vaporized products and passing resulting reflux condensate to the operation as primary cracking stock therefor.

21. The process of cracking hydrocarbons in substantially the liquid phase comprising heating a primary supply of cracking stock to a temperature sufficient to induce cracking therein, then admixing with said primary supply while it is at substantially said temperature a secondary supply of less heated hydrocarbons having on normal distillation a viscous residue, whereby the secondary supply of less heated hydrocarbons is supplied with additional heat sufficient to induce cracking thereof, maintaining the hydrocarbons in admixture for a period of time sufficient to effect a substantial degree of cracking of said secondary supply whereby the normally viscous residues are rendered comparatively non-viscous, and maintaining on the primary and secondary supplies and their admixture a pressure sufficient to prevent material vaporization thereof to the point of pressure release, then discharging the admixed heated hydrocarbons into a vaporizing zone maintained under a materially reduced pressure wherein the residues are separated, fractionating and condensing the vaporized fractions, withdrawing reflux condensate from said fractionating operation and passing the same to the said heating stage as charging stock therefor.

22. The method of continuously skimming and cracking hydrocarbons which comprises forcing a stream of oil through a skimming still under pressure without substantially cracking the constituents of the stream, reducing the pressure on the stream passing from said skimming still to vaporize portions of the oil, at the same time removing the residual oil, subjecting the vaporized portions to reflux condensation, forcing the reflux condensate through a cracking still under a higher pressure so as to crack the intermediate fraction resulting from the skimming operation, expanding the cracked stream passing from said cracking still to vaporize portions of said cracked stream, at the same time removing the cracked residual oil, discharging said cracked residual oil, subjecting the cracked vapors to reflux condensation, and adding the cracked reflux condensate to the reflux condensate produced in said skimming operation.

23. The method of continuously skimming and cracking hydrocarbons which comprises skimming but not substantially cracking a stream of crude oil by heating the stream under pressure to a temperature high enough to vaporize the gas oil and lighter fractions, transmitting the resultant mixture to an expansion chamber, depositing the carbonaceous residual oil in said chamber and maintaining the pressure therein low enough to release said gas oil and lighter fractions in the form of vapors, removing said residual oil from the system, subjecting said vapors to reflux condensation under a pressure lower than the first mentioned pressure and thereby condensing the gas oil fraction of the crude oil, cracking the condensed gas oil by pumping it through a cracking coil under a higher pressure, transmitting the cracked mixture from said coil to a vaporizing chamber and depositing the carbonaceous residuum therein, removing said residuum from the system, subjecting the cracked vapors to reflux condensation, and mixing the resultant reflux condensate with said gas oil fraction of the crude oil passing to said cracking coil, so as to subject the mixture to the cracking operation.

24. The improvement in the art of pyrolytic conversion of hydrocarbons to lower boiling products, which comprises heating a stream of the hydrocarbons in a heating zone and effecting substantial cracking therein, then allowing further cracking in a chamber separate from the zone in which the aforesaid heating occurred, while controlling the temperature in the said chamber by introducing therein a relatively cool hydrocarbon oil, and withdrawing substantially all the fluid products together from the upper portion of said chamber.

25. The improvement in the art of pyrolytic conversion of hydrocarbons to lower boiling products, which comprises heating the hydrocarbons and effecting substantial cracking, allowing cracking to continue in a digestion zone solely on the acquired heat, while controlling the temperature by introducing fluid hydrocarbons cooler than the heated hydrocarbons, and withdrawing substantially all the fluid products together from the digestion zone.

26. The improvement in the art of pyrolytic conversion of hydrocarbons to lower boiling products, which comprises heating a stream of the hydrocarbons in a heating zone and effecting substantial cracking therein, then allowing further cracking in a chamber separate from the zone in which the aforesaid heating occurs, while controlling the temperature in the said chamber by introducing therein a relatively cool hydrocarbon oil, and withdrawing substantially all of the fluid products together from the said chamber.

27. The method of converting high boiling hydrocarbon oils into lower boiling products which comprises subjecting in a heating coil a flowing stream of oil consisting substantially entirely of a normally liquid distillate oil stock to a substantial cracking temperature while maintaining it under a high superatmospheric pressure sufficient to maintain said oil stream in the so-called liquid phase, and thence passing the said oil stream to a separate digestion or reaction stage wherein it is maintained at cracking temperature to effect a substantial amount of further cracking thereof while maintaining it under a high superatmospheric pressure sufficient to maintain it in the so-called liquid phase, thereafter discharging the stream of cracked products from said digestion or reaction stage into a vaporizing zone maintained under a reduced pressure and wherein a substantial portion of cracked products separate in the form of vapors while the remainder thereof separate in the form of heavy liquid residue, simultaneously heating to a high distilling temperature in a separate heated passageway a stream of relatively heavy charging oil stock containing heavy residual constituents while maintaining said stream of oil stock under a superatmospheric pressure and while avoiding subjecting the said stream of oil stock to a substantial degree of cracking, thereafter discharging the latter heated oil stream into said vaporizing zone whereby it admixes with the said stream of cracked products discharged thereinto from said digestion or reaction stage and the lighter constituents thereof separate as vapors and the residual constituents thereof separate as liquid residues, passing the resulting vapor mixture to a fractionating zone and condensing heavier constituents thereof as reflux condensate free of heavy residual constituents, withdrawing and collecting the fractionated vapors as the desired low boiling product, withdrawing reflux condensate from said fractionating zone and passing it to said first-named heating stage as the normally liquid distillate charging stock therefor.

28. The method of converting high boiling hydrocarbon oils into lower boiling products which comprises subjecting in a heating coil a flowing stream of oil consisting substantially entirely of a normally liquid distillate oil stock to a substantial cracking temperature while maintaining it under a high superatmospheric pressure sufficient to maintain said oil stream in the so-called liquid phase, and thence passing the said oil stream to a separate digestion or reaction stage wherein it is maintained at cracking temperature to effect a substantial amount of further cracking thereof while maintaining it under a high superatmospheric pressure sufficient to maintain it in the so-called liquid phase, thereafter discharging the stream of cracked products from said digestion or reaction stage into a vaporizing zone maintained under a reduced pressure and wherein a substantial portion of cracked products separate in the form of vapors while the remainder thereof separate in the form of heavy liquid residue, simultaneously heating to a high distilling temperature in a separate heated passageway a stream of relatively heavy charging oil stock containing heavy residual constituents while maintaining said stream of oil stock under a superatmospheric pressure and while avoiding subjecting the said stream of oil stock to a substantial degree of cracking, thereafter discharging the latter heated oil stream into the said stream of cracked products flowing to said vaporizing zone from said digestion or reaction stage at a point beyond the point of pressure reduction on the said stream of cracked products whereby the said latter heated oil stream is subjected to distillation in said vaporizing zone in admixture with the said cracked products, lighter constituents of said heavy oil stock separating as vapors and the residual constituents thereof separating as liquid residues, passing the resulting vapor mixture to a fractionating zone and condensing heavier constituents thereof as reflux condensate free of heavy residual constituents, withdrawing and collecting the fractionated vapors as the desired low boiling product, withdrawing reflux condensate from said fractionating zone and passing it to said first named heating stage as the normally liquid distillate charging stock therefor.

29. The method of converting hydrocarbon oils into lower boiling products which comprises heating a flowing stream of oil to a cracking temperature and passing said stream of oil through a reaction zone wherein the said stream is maintained at cracking temperature while avoiding separation of vapors from said oil stream at any time, introducing into the said reaction zone a cooler hydrocarbon oil to admix for the first time with the said oil stream undergoing conversion, maintaining said admixed oils in said reaction zone for a time period sufficient for substantial cracking to occur in the admixed oils, thereafter withdrawing from the reaction zone all of the resulting products together, reducing pressure thereon, and discharging them into a separating zone wherein vaporous products are separated for the first time from unvaporized residual products, and passing the said separated vapors to fractionating and condensing operations.

30. The method of converting hydrocarbon oils into lower boiling products which comprises heating a flowing stream of oil to a cracking temperature and passing said stream of oil through a reaction zone wherein the said stream is maintained at cracking temperature while avoiding separation of vapors from said oil stream at any time, introducing into the said reaction zone a cooler hydrocarbon oil to admix for the first time with the said oil stream undergoing conversion, maintaining said admixed oils in said reaction zone for a time period sufficient for substantial cracking to occur in the admixed oils, thereafter withdrawing from the reaction zone all of the resulting products, reducing pressure thereon and discharging them into an enlarged separating zone wherein vapors are separated for the first time from non-vaporous residual products, subjecting the separated vapors to fractionation to condense and separate therefrom in the form of reflux condensate higher boiling constituents thereof, and passing reflux condensate from said fractionating operation to said cracking operation.

31. A method of converting hydrocarbon oils into lower boiling products which comprises raising to a cracking temperature in a heating stage a flowing stream of oil consisting substantially entirely of normally liquid distillate oil and then passing said stream of oil through a reaction zone wherein the said oil stream is maintained at cracking temperature, introducing into the said reaction zone a cooler heavier hydrocarbon oil having on normal distillation a viscous residue to admix for the first time with the said oil stream undergoing conversion, said heavier oil being supplied with sufficient additional heat upon contact with the hotter stream of oil and being maintained in admixture with said oil stream for a time period sufficient to effect sufficient cracking of the said heavy oil after admixture with said oil stream to render the normally viscous residues of the said heavier oil comparatively non-viscous and produce a substantial quantity of lower boiling products from said heavier oil, thereafter withdrawing from the reaction zone all of the resulting products and discharging them into an enlarged separating zone wherein vapors and non-vaporous residual products are separated for the first time.

32. The method of converting hydrocarbon oils into lower boiling products which comprises heating a flowing stream of oil to a cracking temperature, maintaining the said stream at said temperature until the desired conversion thereof is effected and thereafter passing the stream of cracked products into an enlarged separating zone wherein vapors and heavy residual products are separated for the first time, subjecting the separated vapors to fractionation to separate therefrom in the form of reflux condensate higher boiling constituents thereof, passing said reflux condensate to said heating and cracking operation as charging stock therefor while avoiding passage to said heating and cracking operation of any of the said heavy residual products separated in said separating zone, and introducing into the said stream of oil at a point intermediate the said heating stage and the separating zone a secondary supply of cooler hydrocarbons having on normal distillation a viscous residue while limiting the quantity of cooler hydrocarbons to such an extent that they are raised to a substantial cracking temperature upon contacting the said stream of oil undergoing cracking, the point of introduction of said secondary supply of hydrocarbons into said stream undergoing cracking being such that the said secondary supply of hydrocarbons undergoes such a degree of cracking after admixture and prior to the time the admixed stream reaches the said separating zone that the normally viscous residues are rendered comparatively non-viscous and a substantial quantity of lower boiling products is produced therefrom.

JOHN C. BLACK.